(12) United States Patent
Den et al.

(10) Patent No.: US 7,192,510 B2
(45) Date of Patent: Mar. 20, 2007

(54) FLUID CONTROL DEVICE AND METHOD OF MANUFACTURING THE SAME

(75) Inventors: Tohru Den, Tokyo (JP); Kazuhiko Fukutani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 594 days.

(21) Appl. No.: 10/735,000

(22) Filed: Dec. 11, 2003

(65) Prior Publication Data
US 2004/0146705 A1 Jul. 29, 2004

(30) Foreign Application Priority Data
Dec. 13, 2002 (JP) ............................. 2002-363129

(51) Int. Cl.
*C25D 11/04* (2006.01)
*C25D 11/12* (2006.01)
*C25D 11/18* (2006.01)
*C23C 18/00* (2006.01)
*B01D 67/00* (2006.01)
*B01D 71/02* (2006.01)

(52) U.S. Cl. ....................... 205/171; 205/175; 205/190; 205/223; 205/224; 205/325

(58) Field of Classification Search ................ 205/171, 205/175, 190, 223, 224, 325
See application file for complete search history.

(56) References Cited

U.S. PATENT DOCUMENTS 4,717,455 A * 1/1988 Textor et al. ............... 205/213
5,089,299 A * 2/1992 Van 'T Veen et al. ....... 427/245
5,137,634 A * 8/1992 Butler et al. ................ 210/490
6,045,677 A * 4/2000 Beetz et al. ................. 205/50
6,139,713 A * 10/2000 Masuda et al. .............. 205/206
6,279,913 B1 8/2001 Iwashita et al.

FOREIGN PATENT DOCUMENTS

| JP | H4-12169 | 4/1986 |
| JP | H7-112531 | 8/1989 |
| JP | H2 218422 | 8/1990 |

* cited by examiner

*Primary Examiner*—Roy King
*Assistant Examiner*—William T. Leader
(74) *Attorney, Agent, or Firm*—Morgan & Finnegan, LLP

(57) ABSTRACT

A fluid control device has very fine pores with an average diameter not greater than 10 nm and provides a large flux. The fluid control device comprises an anodized alumina film having fine pores and a silicon based micro-porous film having very fine pores and made from an AlSi mixed film and the fine pores and the very fine pores are at least partly linked with each other. The fluid control device is prepared from a film including at least an aluminum layer and an AlSi mixed film by forming an anodized alumina film having fine pores by way of an anodization process for the aluminum layer part and also forming a silicon based micro-porous film having very fine pores containing silicon as principal ingredient by way of an anodization process or etching process for the AlSi mixed film. The fluid control device can be used as filter or ultrafilter film that allows fluid and gas to pass through it.

7 Claims, 7 Drawing Sheets

FLUID CONTROL DEVICE AND METHOD OF MANUFACTURING THE SAME

BACKGROUND OF THE INVENTION

1. Field of the Invention

This invention relates to a fluid control device and a method of manufacturing the same. More particularly, the present invention relates to a fluid control device applicable to filters, flow rate control systems and separators to be used for gas and fluid.

2. Related Background Art

Filter membranes are typical examples of known fluid control devices. Organic filter membranes of polymer materials including cellulose based, polysulfone based and polyolefin based polymer materials are being popularly used. Inorganic filter membranes of porous materials including Vycor glass, carbon tubes, silica based ceramic materials and anodized alumina film are also popularly being used. Films of the above listed organic materials are also being used as ultrafilter membranes.

Filter membranes as listed above are semipermeable films mainly having very fine pores of several nanometers to tens of several nanometers and adapted to operate on the basis of utilization of the pressure difference between the front side and the rear side, or the upstream side and the downstream side, of the film as drive force.

Anodized alumina film that is closely related to the present invention will be described in greater detail below.

Anodized alumina film is a porous film in which fine pores grow from the film surfaces in a direction perpendicular to the surfaces. The porous oxide film is characterized in that it has a peculiar geographical structure in which very fine pores having a diameter (2r) of several to hundreds of several nanometers are arranged substantially in parallel with each other with a gap (2R) of tens to hundreds of several nanometers separating adjacent ones. The pores show a high aspect ratio and their diameters are highly uniform. It is possible to control the diameter 2r and the gap 2R to a certain extent by regulating the electric current and the voltage that are used in the anodization process.

When anodized film of aluminum is used for a filter membrane, it needs to be peeled off from the underlying aluminum.

Japanese Patent Application Laid-Open Publication No. H4-12169 discloses a method of forming a porous film by anodizing metal aluminum or an aluminum alloy and subsequently removing all the metal by etching except the porous part thereof.

Japanese Patent Application Laid-Open Publication No. H7-112531 discloses a method of carrying an anodized film by means of pits produced by electrolytic etching, which does not involve the technique of removing the underlying metal by etching, using a solution.

Japanese Patent Application Laid-Open No. H2-218422 discloses a method of manufacturing a film, in which large diameter pores and small diameter pores are linked by modifying the anodizing condition in the course of anodization process.

U.S. Pat. No. 6,279,913 discloses a fluid control device using an anodized film of an aluminum alloy to which silicon is added. While a material of ADC12, AC4C or A4000 type is used as aluminum alloy to which silicon is added, silicon is not uniformly dispersed in such a material and hence it can deter the process of anodization.

The above listed known fluid control devices, organic filter membranes in particular, have drawbacks in terms of chemical-resistance and heat-resistance. On the other hand, it is difficult to mold films of inorganic materials, in particular those of ceramic materials.

Anodized alumina film is an inorganic material that is highly resistant relative to alkaline aqueous solutions, acidic solutions and organic solvents, although strong alkaline solutions are exceptions. While it is formed as film whose profile can be controlled to some extent, pores are apt to show a diameter greater than 10 nm because an etching operation is conducted in the step of peeling off the alumina film.

When anodized alumina film is used for filters, not only the pore diameter but also the flux (the flow rate per unit area) of the film is important. As the pore diameter is reduced or the pore length is increased, the flux decreases proportionally. In order to increase the flux and reduce the pore diameter, the thickness of the porous film having a small pore diameter needs to be reduced. However, it is difficult to prepare such a film.

It is also very difficult to control fine pores having a diameter smaller than 10 nm so as to make them show a uniform diameter.

Thus, it is an object of the present invention to dissolve the above identified problems and provide a film of an inorganic material having fine pores with a diameter not greater than 10 nm. In view of the fact that a porous film having a pore diameter not greater than 10 nm can show a low flux when it has a large thickness, it is another object of the present invention is to provide a carrier film that can be used to carry a porous film on a stable basis when such a porous film is prepared with a reduced thickness.

Still another object of the present invention is to provide a method of manufacturing a porous film.

SUMMARY OF THE INVENTION

According to the invention, there is provided a fluid control device comprising: a film having fine pores and formed by anodizing a material containing aluminum as principal ingredient; and a film having very fine pores smaller than the pores and containing silicon as principal ingredient; at least some of the fine pores and some of the very fine pores are linked with each other along the flow path of fluid to be controlled.

According to the invention, there is provided a method of manufacturing a fluid control device comprising: a step of forming a mixed film of $Al_{1-x}Si_x$ ($0.2 \leq x \leq 0.7$) including a layer containing at least aluminum as principal ingredient and cylinders having an average diameter not greater than 10 nm and containing aluminum as principal ingredient and subsequently forming fine pores in the layer containing aluminum as principal ingredient by anodization; and a step of removing the cylinders containing aluminum as principal ingredient from the mixed film of $Al_{1-x}Si_x$.

DETAILED DESCRIPTION OF THE PREFERRED EMBODIMENTS

Figure 1A:
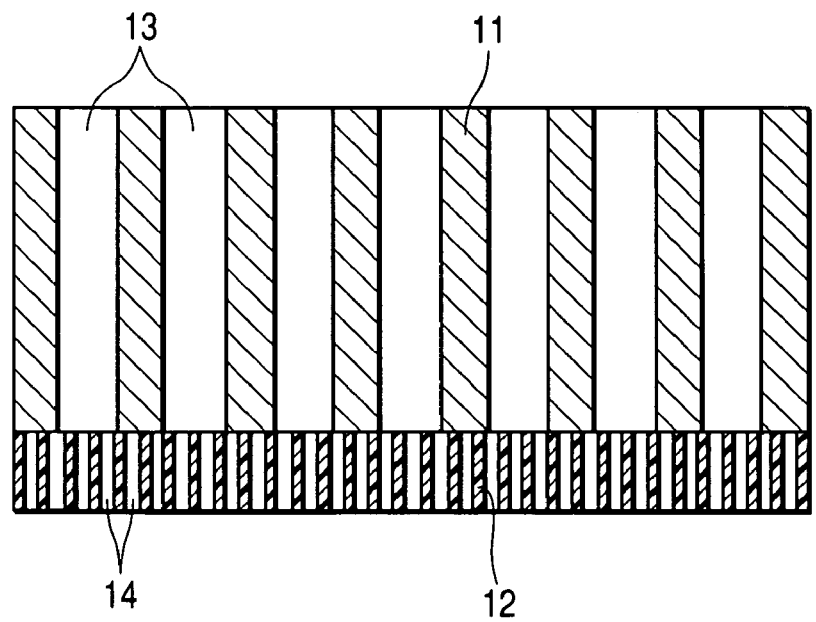
FIGS. 1A and 1B schematically illustrate the concept of an embodiment of fluid control device according to the invention.

Now, the characteristic aspects of the present invention will be described below.

To simplify the following description, a film having fine pores and formed by anodizing a material containing aluminum as principal ingredient is referred to as "anodized alumina film" and a film having very fine pores and containing silicon as principal ingredient is referred to as "silicon based micro-porous film" hereinafter.

A fluid control device according to the invention is realized by using an anodized alumina film and an "AlSi nano-mixed film (AlSi mixed film)" invented by the inventors of the present invention as porous film and effectively linking fine pores located therein.

Now, an "AlSi mixed film" invented by the inventors of the present invention will be described.

An AlSi mixed film is a film-shaped structure containing Al and Si, in which pillar-shaped members (to be referred to as "cylinders" hereinafter) that contain Al are surrounded by a region that contains Si and the content ratio of Si relative to the total quantity of Al and Si in the structure is not smaller than 20 atomic % and not greater than 70 atomic %.

The content ratio of Si relative to the total quantity of Al and Si in the structure is preferably not smaller than 25 atomic % and not greater than 65 atomic %, more preferably not smaller than 30 atomic % and not greater than 60 atomic %.

For the purpose of the present invention, it is sufficient that substantially pillar-shaped members are formed in the structure. The cylinders may contain Si and the region may contain Al. For example, the cylinders and the surrounding region may contain oxygen, argon, nitrogen and/or hydrogen to a slight extent.

The above ratio can be determined by using inductively coupled plasma emission spectrometry for quantitative analysis. While atomic % is used as unit to express the content ratio of aluminum or silicon, wt % may alternatively be used. Then, a silicon content ratio of not smaller than 20 atomic % and not greater than 70 atomic % will paraphrased into not smaller than 20.65 wt % and not greater than 70.84 wt %. (Atomic % is reduced into wt % by determining the weight ratio of Al and Si, using atomic weights of 26.982 and 28.086 respectively for Al and Si.)

The region surrounding the cylinders is preferably amorphous, although it may not necessarily be so.

The cylinders show a circular or elliptic plan view.

In the structure, a number of cylinders are dispersed in a matrix containing Si. It is possible to control the diameter of the cylinders (when the cylinders show a circular plan view) as a function of the composition of the structure (the content ratio of the second material). The average diameter is not smaller than 0.5 nm and not greater than 50 nm, preferably not smaller than 0.5 nm and not greater than 20 nm, more preferably not smaller than 0.5 nm and not greater than 10 nm. When the cylinders show an elliptic plan view, it is sufficient that the major axis is found within the above range. The average diameter as used herein refers to the value that can be obtained when the pillar-shaped members (in an area of about 100 nm×70 nm) shown on an SEM photograph are gauged directly or subjected to an image processing operation of a computer. For practical purposes, the lower limit of the average diameter is not smaller than 1 nm or several nm.

The distance 2R between the centers of any adjacently located cylinders is not smaller than 2 nm and not greater than 30 nm, preferably not smaller than 5 nm and not greater than 20 nm, more preferably not smaller than 5 nm and not greater than 15 nm. It may be needless to say that the lower limit of the distance 2R between the centers of adjacently located cylinders is such that any adjacently located pillar-shaped structure parts do not contact with each other.

Thus, in a film-shaped structure as defined above, the cylinders are dispersed in the matrix containing Si in such a way that they are substantially perpendicular to the intra-planar direction of the film. While there are no particular limitations to the film thickness of such a film-shaped structure, the structure can find applications when the thickness is between 10 nm and 100 μm. In view of the process time and other factors, a film thickness between 1 nm and 1 μm is realistic. Particularly, it is desirable that the pillar-shaped structure parts are maintained if the film thickness is greater than 300 nm.

A film-shaped structure as defined above can be prepared by means of a technique of forming film in a non-equilibrium state. While sputtering is most preferably used for forming film in a non-equilibrium state, other techniques for forming film in a non-equilibrium state such as resistance heat evaporation, electron beam evaporation (EB evaporation) and ion plating are also applicable. Sputtering may be magnetron sputtering, RF sputtering, ECR sputtering or DC sputtering. When sputtering is used, film is formed normally in an argon gas atmosphere in a reactor, in which pressure is held to a level between about 0.2 Pa and 1 Pa. While the first material and the second material may be prepared separately as target materials for sputtering, a target material prepared by sintering the first material and the second material and containing those materials at a predetermined ratio may alternatively be used.

The structure is preferably formed on a substrate, which is held to a temperature level not lower than 20° C. and not higher than 300° C., preferably not lower than 20° C. and not higher than 200° C.

A porous body containing a plurality of pillar-shaped pores is formed by removing the cylinders from the film-shaped structure (by means of wet etching or dry etching).

More specifically, a method of manufacturing a porous body is characterized by comprising a step of preparing a film-shaped structure containing Al and Si and including cylinders containing Al and a region containing Si and surrounding the cylinders, the structure containing Si at a ratio not smaller than 20 atomic % and not greater than 70 atomic % relative to the total quantity of Al and Si, and a step of removing the cylinders from the structure.

It is sufficient for the etching operation to selectively remove the cylinders. Etching solutions that can suitably be used for the etching operation include those of acids such as phosphoric acid, sulfuric acid, hydrochloric acid and nitric acid and those of alkalis. Preferably, the pores of the porous body produced by removing the cylinders are not linked to each other but independent from each other. An anodization process may be used for the removing step.

A "film having very fine pores and containing silicon as principal ingredient (silicon based micro-porous film)" to be used for the purpose of the present invention corresponds to a porous body that is obtained from a structure as defined above, which is an "AlSi mixed film".

While it is difficult to prepare a fluid control device having fine pores with a diameter smaller than 10 nm from known anodized alumina film, a film having very fine pores with a diameter smaller than 10 nm or even smaller than 5 nm can be formed from such an "AlSi nano-mixed film" and it is now possible to obtain a fluid control device that can secure a desired level of flux by ingeniously bonding such films to reduce the thickness of the micro-porous film.

A fluid control device according to the invention is characterized by being highly chemical-resistant because it is formed from inorganic materials. Not only alumina but also silicon or silicon oxide is highly heat-resistant so that it is possible to provide a fluid control device that can withstand hot operating conditions.

A fluid control device according to the invention can find applications including filters, various filtering apparatus and flow rate control systems. In other words, the scope of application is very broad.

A device according to the invention is characterized by comprising a first porous body containing alumina and having pores with a first diameter and a second porous body containing silicon or silicon oxide and having pores with a second diameter smaller than the first diameter. A device as used herein refers to a filter, a fluid control device or any device in which fluid flows through the porous bodies. For the purpose of the present invention, silicon may be replaced by germanium, germanium oxide, a mixture of silicon and germanium or a mixture of silicon oxide and germanium oxide.

Now, embodiments of fluid control device and method of manufacturing such a device according to the invention will be described by referring to FIGS. 1A through 7.

(Configuration of Fluid Control Device)

Embodiments of fluid control device according to the invention will be described by referring to the related drawings. FIGS. 1A through 3 illustrate the concepts of the embodiments of fluid control device.

FIG. 1A is a schematic cross sectional view of an embodiment of fluid control device having the simplest configuration. In FIG. 1A, there are shown an anodized alumina film 11, a silicon based micro-porous film 12, fine pores of anodized alumina film 13 and very fine pores of silicon based micro-porous film 14. The anodized alumina film 11 and the silicon based micro-porous film 12 form a multilayer film in such a way that the fine pores 13 and the very fine pores 14 are linked to each other.

Figure 1B:
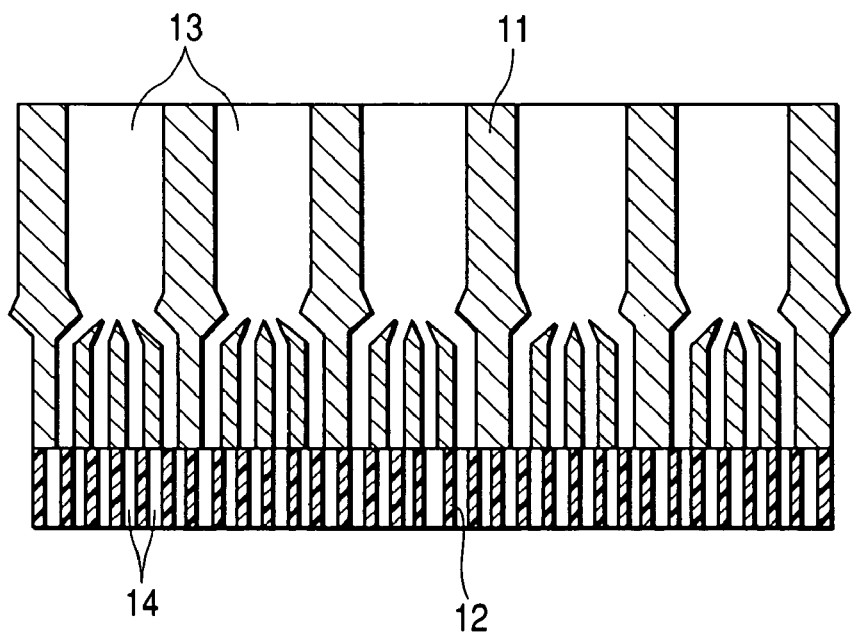

FIG. 1B illustrates an arrangement similar to that of FIG. 1A. The illustrated fluid control device also comprises an anodized alumina film 11 having fine pores 13 and a silicon based micro-porous film 12 having very fine pores 14. However, the diameter of the fine pores 13 in the anodized alumina film 11 is reduced in a part thereof that is connected to the silicon based micro-porous film 12.

Figure 2A:
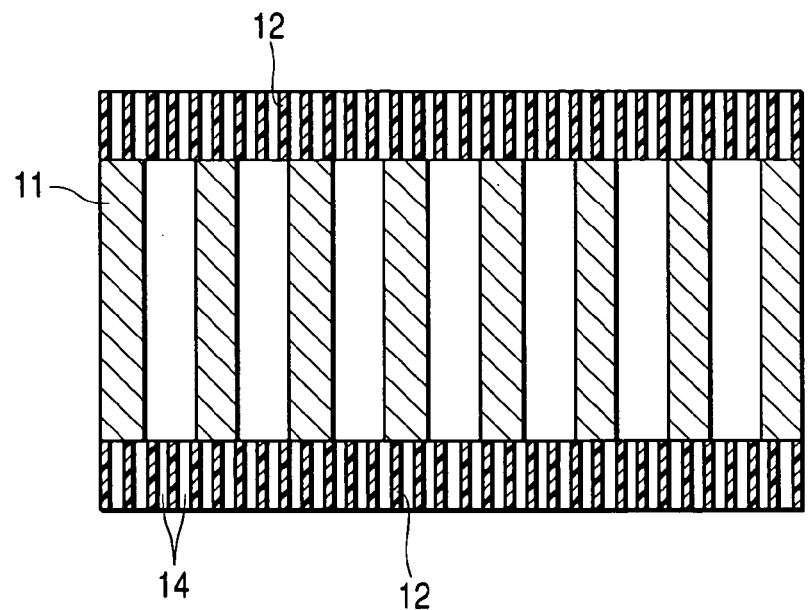
FIGS. 2A and 2B schematically illustrate the concept of another embodiment of fluid control device according to the invention.

FIG. 2A illustrates an arrangement similar to that of FIG. 1A. The illustrated fluid control device also comprises an anodized alumina film 11 having fine pores 13 and a silicon based micro-porous film 12 having very fine pores 14. However, another silicon based micro-porous film 12 is provided at the other side of the anodized alumina film 11 so that the anodized alumina film 11 is sandwiched by the silicon based micro-porous film 12, 12.

Figure 2B:
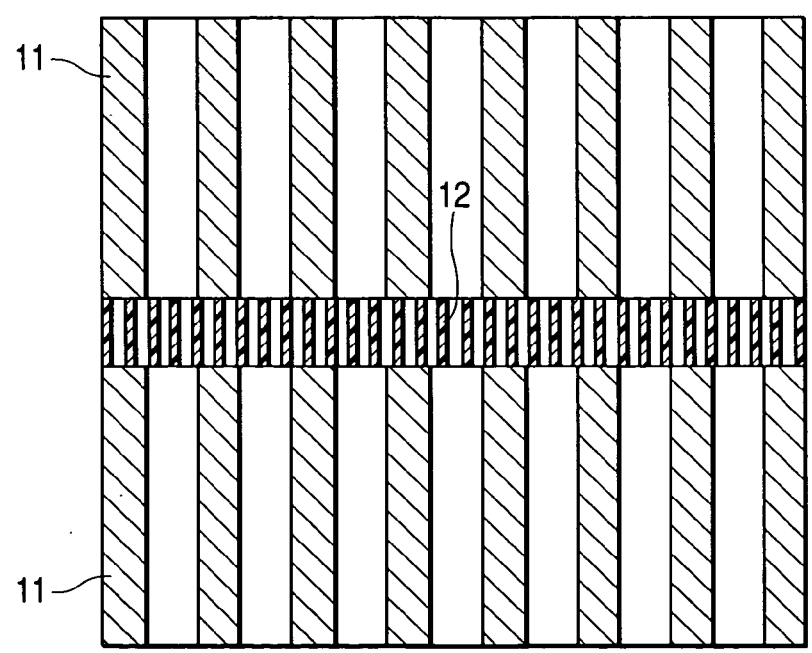

FIG. 2B illustrates an arrangement similar to that of FIG. 1A. The illustrated fluid control device also comprises an anodized alumina film 11 having fine pores 13 and a silicon based micro-porous film 12 having very fine pores 14. However, another anodized alumina film 11 is provided at the other side of the silicon based micro-porous film 12 so that the silicon based micro-porous film 12 is sandwiched by the anodized alumina film 11, 11.

Figure 3:
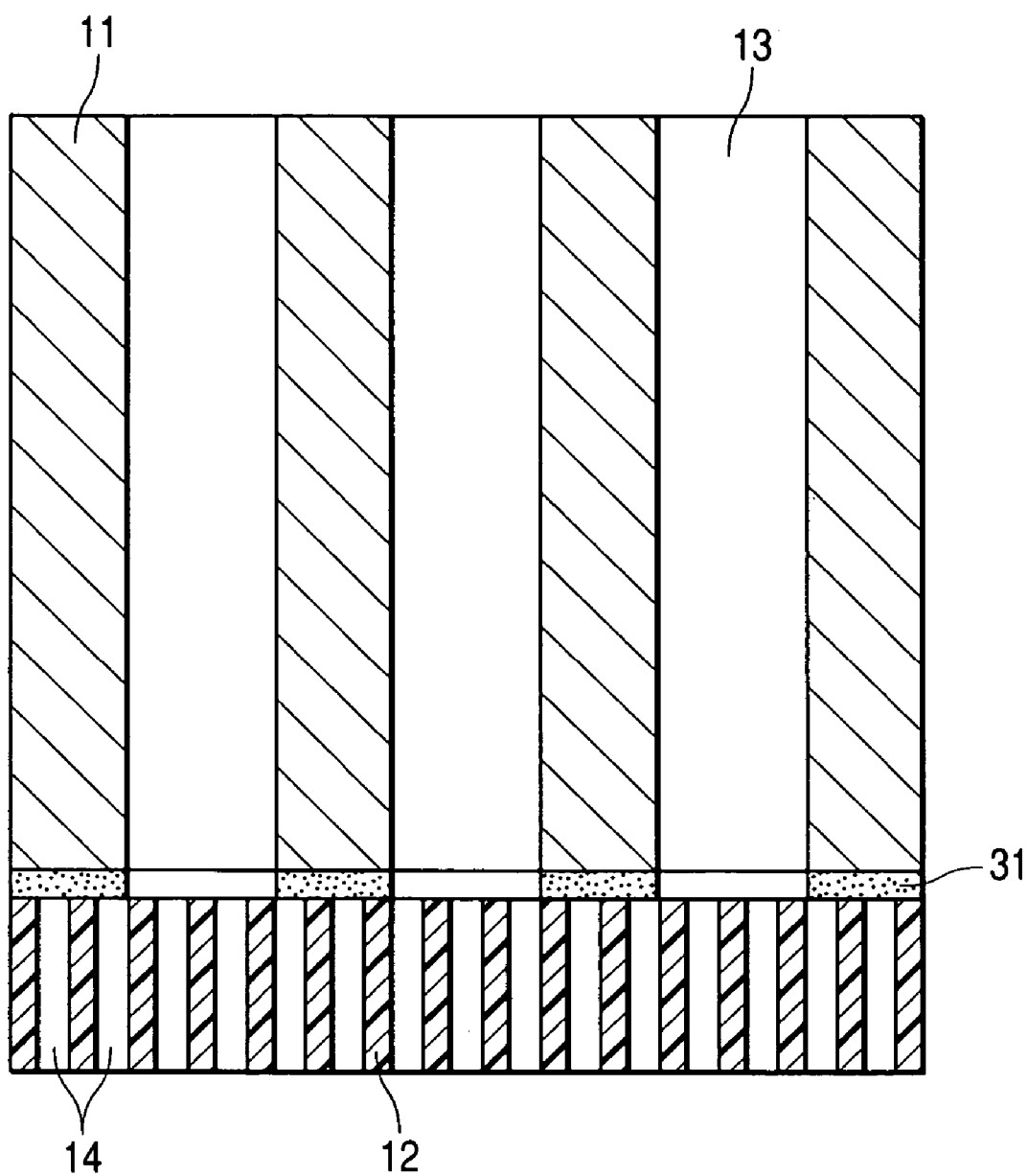
FIG. 3 schematically illustrates the concept of still another embodiment of fluid control device according to the invention.

FIG. 3 illustrates an arrangement similar to that of FIG. 1A. The illustrated fluid control device also comprises an anodized alumina film 11 having fine pores 13 and a silicon based micro-porous film 12 having very fine pores 14. However, a bonding layer 31 is inserted in the bonding area of the anodized alumina film 11 and the silicon based micro-porous film 12 in order to enhance the bonding strength.

Throughout the arrangements in FIGS. 1A through 3, the anodized alumina film 11 contains aluminum and oxygen as principal ingredients and has a large number of cylinder-shaped fine pores 13 that are arranged substantially perpendicularly relative to the surfaces of the film and in parallel with each other at regular intervals. The diameter 2r of the fine pores 13 is between several nanometers and hundreds of several nanometers and the gap 2R separating the centers of adjacently located fine pores 13 is between tens of several nanometers and hundreds of several nanometers. The diameter 2r of the fine pores 13 is a little under 10 nm or between 8 and 9 nm at smallest. The diameter 2r of the fine pores 13 formed in the anodized alumina film 11 is preferably smaller at the side connected to the silicon based micro-porous film 12 and, in view of flux, the diameter 2r of the fine pores 13 is preferably larger in all the remaining part thereof other than the side connected to the silicon based micro-porous film 12.

On the other hand, the silicon based micro-porous film 12 contains amorphous silicon or silicon oxide as principal ingredient and has very fine pores 14 that are arranged substantially perpendicularly relative to the surfaces of the film and in parallel with each other at regular intervals as in the case of the fine pores of the anodized alumina film 11. However, the diameter of the very fine pores 14 is between about 3 and 10 nm when amorphous silicon is used and between about 1 and 8 nm when silicon oxide is used. There may be cases where the silicon based micro-porous film 12 contains aluminum to a slight extent.

The anodized alumina film 11 and the silicon based micro-porous film 12 may be directly bonded to each other as shown in FIGS. 1A through 2B. Alternatively, some other film that also has fine pores may be inserted between them. Or, as shown in FIG. 3, a bonding layer 31 may be inserted in the bonding area of the anodized alumina film 11 and the silicon based micro-porous film 12 in order to enhance the bonding strength. Each of the anodized alumina film 11 and the silicon based micro-porous film 12 is not necessarily be a single layer film, although a single layer arrangement is shown in FIGS. 1A, 1B and 3. In other words, a plurality of anodized alumina films 11 and/or a plurality of silicon based micro-porous films 12 may be arranged as shown in FIGS. 2A and 2B. For the purpose of the present invention, silicon may be replaced by germanium, germanium oxide, a mixture of silicon and germanium or a mixture of silicon oxide and germanium oxide.

(Method of Preparing Fluid Control Device (Nano-structure))

Now, the method of preparing a fluid control device having a basic configuration as shown in FIG. 1A will be described by referring to FIGS. 4A through 4D, 5A through 5D and 6. This method comprises a step of preparing a base member, a step of forming fine pores in an aluminum part (a step of forming fine pores 13 in an anodized alumina film 11) and a step of forming very fine pores in an AlSi part (a step of forming very fine pores 14 in a silicon based micro-porous film 12). Each of the steps will be described below.

1) Step of Preparing a Base Member

Figure 4A:
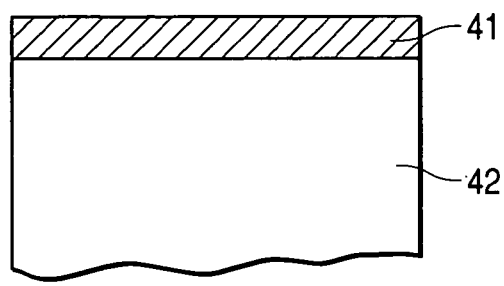
FIGS. 4A, 4B, 4C and 4D schematically illustrate the steps of an embodiment of method of manufacturing a fluid control device according to the invention.

Referring to FIG. 4A, firstly in the step of preparing a base member, a plate or foil of aluminum 42 that is used as base member is polished to make the surface sufficiently flat. The polishing operation may be a mechanical polishing operation or an etching operation using a solution. If this step is an electrolytic etching step, the treated aluminum surface may show undulations to a certain extent, although such undulations are allowable so long as they do not give rise to any problem in use. While there are no limitations to the thickness of aluminum 42, it is preferably not smaller than 10 μm from the viewpoint of convenience of handling. If the aluminum part is not subjected to a dissolving/removing step after anodization, the aluminum 42 preferably has a thickness of not greater than 500 μm. When a very small fluid control device and/or a support member is involved, the use of aluminum film is also feasible. Then, an ordinary film forming process such as sputtering or resistance heat evaporation can be used for forming an aluminum film.

Then, an AlSi mixed film 41 is formed on the surface of the flat aluminum 42 as shown in FIG. 4A. This film forming step is preferably a step of passing through a non-equilibrium process such as a sputtering process. If the mixing ratio of AlSi is expressed by $Al_{1-1}Si_x$, a requirement of $0.2 \leq x \leq 0.7$ needs to be met. It is preferable that a requirement of $0.3 \leq x \leq 0.5$ is met. Impurities may be contained in the mixture to a slight extent. When an AlSi mixed film 41 is formed under this condition, very fine cylinders (pillar-shaped members) containing aluminum as principal ingredient and running perpendicularly relative to the film surfaces are numerously formed in the film 41. The diameter of the cylinders is about 2 to 10 nm and the distance separating the centers of adjacently located cylinders is about 5 to 15 nm. All the film 41 except the cylinders is made of amorphous silicon and slightly contains aluminum. While there are no limitations to the AlSi mixed film 41, it is preferably not smaller than 10 nm and not greater than 1 μm. The AlSi mixed film may be destructed during the preparation process or in use if the thickness is smaller than 10 nm, whereas it may be not possible to secure a sufficiently large flux if the thickness is greater than 1 μm.

2) Step of Forming Fine Pores in Aluminum Parts

Figure 4B:
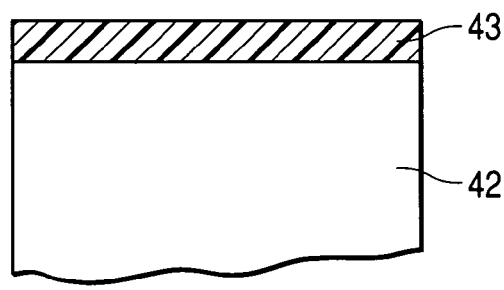
Figure 4C:
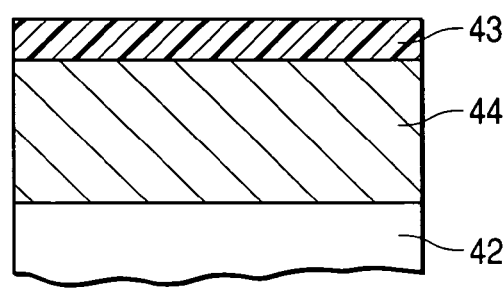

An anodization step is used to form fine pores in the parts of aluminum 42 as shown in FIG. 4C. While an electrolytic etching pit forming step may be added to the anodization step, the most basic step will be described here by referring to FIG. 6.

Figure 6:
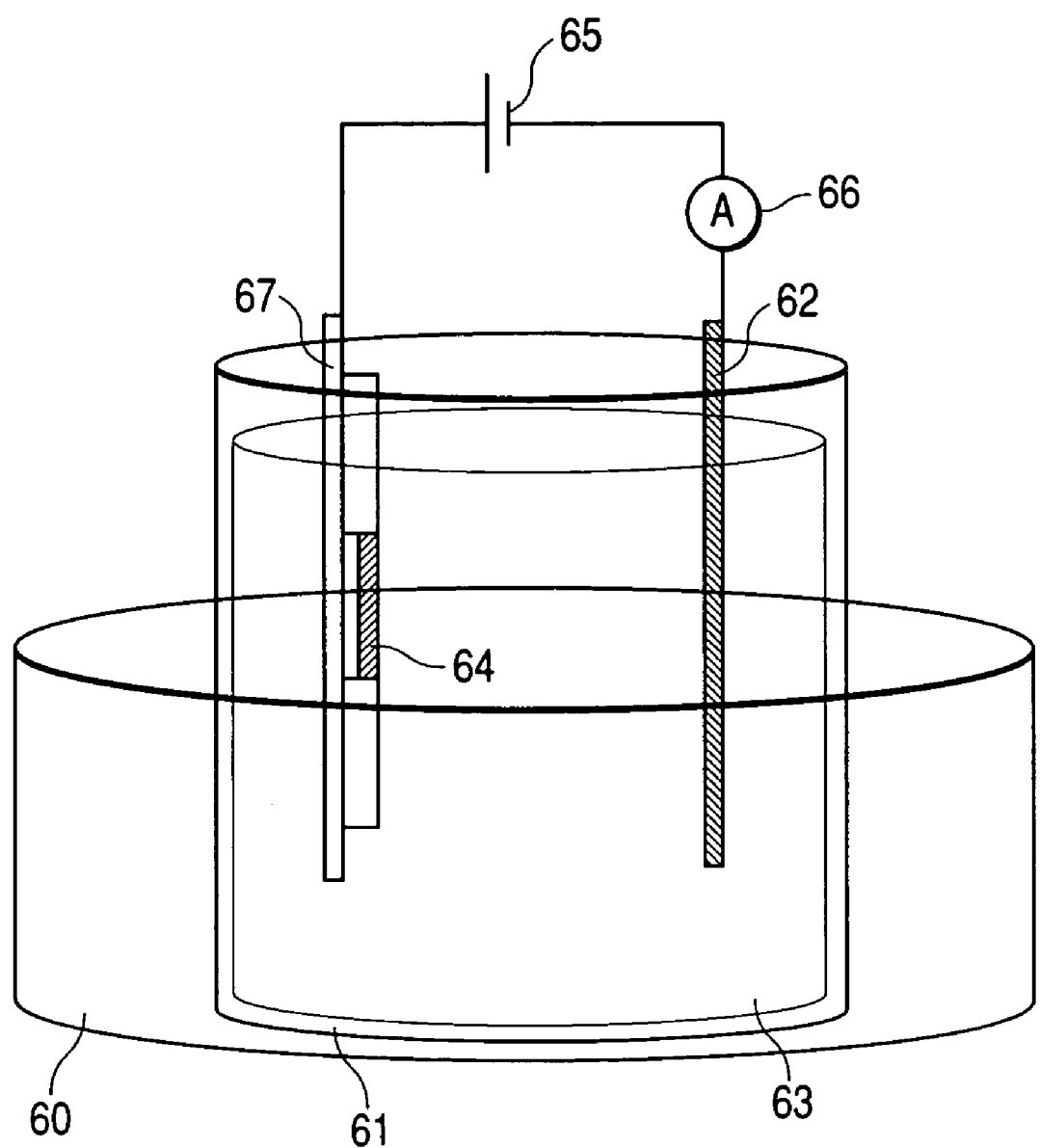
FIG. 6 schematically illustrates an anodization apparatus that was used in the examples where a fluid control device according to the invention was prepared.

FIG. 6 schematically illustrates an anodization apparatus that can be used for this step. In FIG. 6, there are shown a thermostatic tank 60, a reaction container 61, an opposed electrode 62 such as a platinum plate, an electrolytic solution 63, a specimen 64, a power source 65 for applying an anodization voltage, an ammeter 66 for gauging the anodization current and a specimen holder 67. Although not shown, a computer is also installed to automatically gauge and control the voltage and the electric current.

The specimen 64 and the opposed electrode 62 are arranged in the electrolytic solution 63 whose temperature is held to a constant level by the thermostatic tank 60 and anodization takes place as a voltage is applied between the specimen and the opposed electrode 62 from the power source 65. In FIG. 6, reference symbol 67 denotes a holder that is provided so that no voltage is applied to any unrelated areas.

The electrolytic solution 63 to be used for anodization is typically selected from solution of oxalic acid, phosphoric acid, sulfuric acid or chromic acid, of which solution of sulfuric acid is preferable when a low voltage (up to about 30V) is used and that of phosphoric acid is preferable when a high voltage (60V or above) is applied, while that oxalic acid is preferably used when the voltage is between the above listed values. The anodization voltage and the gap separating adjacent fine pores are correlated with a relationship that can be approximately expressed by the formula below.

gap separating adjacent fine pores (nm)=2.5× anodization voltage     (V)

It is not necessary to apply a constant voltage for anodization of aluminum. The voltage may be controlled to a constant level or the voltage and the electric current may be intentionally modified in the course of anodization.

While the diameter of the fine pores immediately after the anodization step is dependent on the density and temperature of the electrolytic solution used for the anodization, the technique of applying the anodization voltage, the voltage value and so on, the pore diameter can be increased almost to a desired value by a subsequent pore widening process, for which aqueous solution of phosphoric acid or alkali may be used.

The thickness of anodized alumina film can be controlled by means of the duration of anodization and/or the thickness of the aluminum foil or aluminum film. It is typically between 10 nm and 500 μm.

3) Step of Forming Very Fine Pores in the AlSi Part

A silicon based micro-porous film 43 shown in FIG. 4B is produced from the AlSi mixed film 41 shown in FIG. 4A and described above. Any of several techniques can be used to produce very fine pores in the AlSi mixed film 41.

A) A Step of Forming Amorphous Silicon Based Micro-porous Film

An amorphous silicon based micro-porous film can be obtained by removing Al cylinders by etching from a film in which Al cylinders are dispersed in a matrix of amorphous silicon. This etching process is performed by selectively dissolving aluminum into a solution. For example, an aqueous solution of acid such as phosphoric acid can be used for the process. Alternatively, an amorphous silicon based micro-porous film can be obtained by immersing a film containing Al cylinders into an alkali solution (e.g., KOH solution). The diameter of the very fine pores can also be increased by this etching process.

B) A Step of Forming Silicon Oxide Based Micro-porous Film

A micro-porous film containing silicon oxide as principal ingredient can be obtained by subjecting an amorphous silicon based micro-porous film to thermal oxidation or chemical oxidation such as anodization. Alternatively, a micro-porous film containing silicon oxide as principal ingredient can be obtained by directly anodizing an AlSi mixed film 41. The anodizing operation is preferably conducted by using sulfuric acid with an anodization voltage not higher than 3V. The diameter of the very fine pores is apt to be reduced in this oxidation step. Thus, the pore diameter may be smaller than that of the very fine pores of an amorphous silicon based micro-porous film by tens of several percents.

The step of forming a silicon based micro-porous film will be conducted prior to that of forming an anodized alumina film or vice versa depending on the configuration of the multilayer film to be obtained. When an AlSi mixed film 41 is formed on aluminum 42 as shown in FIGS. 4A through 4D (see FIG. 4A), fine pores are formed in the AlSi mixed film 41 (see FIG. 4B) and subsequently a step of anodization of aluminum 42 will be conducted (see FIG. 4C).

If, on the other hand, an aluminum film 52 is formed on an AlSi mixed film 51 as shown in FIGS. 5A through 5D (see FIG. 5A), a step of producing an anodized alumina film 54 by anodizing the aluminum film 52 is conducted firstly (see FIG. 5B) and subsequently a step of producing a silicon based micro-porous film 55 (see FIG. 5C) and a step of peeling off the silicon based micro-porous film 55 from the underlying layer 53 (see FIG. 5D) are sequentially conducted.

4) Other Steps

An annealing step may advantageously and effectively be conducted after the above steps because moisture and/or acid can remain in the obtained film immediately after the anodization step. The annealing step can be conducted at temperature as high as about 1,000° C., although the actual temperature level may vary depending on the circumstances. The moisture remaining in the film is removed when annealed at temperature above 100° C. and the crystallinity of the anodized film can be enhanced at a higher temperature level. As a result of this step, the chemical-resistance and the heat-resistance of the product will be improved. While the annealing step may be conducted in air or in oxygen, it is preferably conducted in inert gas, in an reducing atmosphere or in vacuum when it is desired to obtain a micro-porous film of amorphous silicon.

An etching process using a solution or a mechanical peeling process can be used for the peeling step.

It is also effective to form a very thin bonding film 31 between the anodized alumina film and the silicon based micro-porous film as shown in FIG. 3. It is effective for the bonding film to contain Ti, Zr, Hf, Nb, Ta, Mo or W as principal ingredient and the film thickness is preferably between about 0.5 and 10 nm.

With the above described embodiments, it is possible to produce fine pores with a pore diameter not greater than 10 nm or even not greater than 5 nm with an enhanced level of controllability and the obtained film provides advantages of durability and ease of handling when used for a fluid control device. The use of such very fine pores makes it possible to filter fine substances and control the flow rate of fluid. For example, DNA has a diameter of about 2 nm and such a fine substance can be separated by using very fine pores of the above identified size.

Now, the present invention will be described further by way of examples.

EXAMPLE 1

First Material Al, Second Material Si

In this example, aluminum wires were prepared for a silicon based micro-porous film from a structure including aluminum cylinders as so many aluminum parts of the structure and a silicon part surrounding the cylinder-shaped aluminum, of which the aluminum cylinders had a diameter 2r of 3 nm and a length L of 200 nm and were arranged in such a way that each cylinder was separated from adjacent pillars by a gap 2R of 7 nm.

The aluminum wires were prepared in a manner as described below.

An aluminum/silicon mixed film containing silicon by 55 atomic % relative to the total quantity of aluminum and silicon was formed to a thickness of about 200 nm on a glass substrate by RF magnetron sputtering. A target formed by placing eight 15 mm-squre silicon chips 13 on a 4-inch aluminum target was used. The sputtering operation was conducted by using an RF power source under the condition of an Ar flow rate: 50 sccm, a discharge pressure: 0.7 Pa and a making power: 1 kW. The substrate was held to room temperature.

While the target was formed by placing eight 15 mm-squre silicon chips 13 on an aluminum target in this experiment, the number of silicon chips is not limited to eight and may be varied depending on the sputtering condition so long as the formed aluminum/silicon mixed film contains silicon by about 55 atomic %. The target is not limited to one obtained by placing silicon chips on an aluminum target. Alternatively, a target formed by placing aluminum chips on a silicon target or a target formed by sintering powdery silicon and powdery aluminum may be used.

Then, the obtained aluminum/silicon mixed film was analyzed for the partial quantity (atomic %) of silicon relative to the total quantity of aluminum and silicon by means of ICP (inductively coupled plasma emission spectrometry). As a result, the partial quantity of silicon relative to the total quantity of aluminum and silicon was found to be about 55 atomic %. Note that, in this experiment, the aluminum/silicon mixed film was deposited on a carbon substrate for the convenience of analysis.

Thereafter, the aluminum/silicon mixed film was observed through an FE-SEM (field emission scanning electron microscope). When the surface was viewed from right above the substrate, it was found that circular aluminum nano-structure parts (fine pillars) were two dimensionally arranged and surrounded by silicon there. The aluminum nano-structure parts had a diameter of 3 nm and the average intercentral distance separating adjacently located aluminum nano-structure parts was 7 nm. When a cross section of the specimen was observed through an FE-SEM, it was found that the aluminum nano-structure parts had a length of 200 nm and were independent from each other.

When the specimen was observed by X-ray diffractometry, no silicon peaks that show crystallinity of silicon were found to prove that the silicon of the specimen was amorphous.

Thus, an aluminum/silicon nano-structure including aluminum wires having a diameter 2r of 3 nm and a length L of 200 nm, each being separated from adjacent pillars by a gap 2R of 7 nm, and surrounded by silicon was obtained.

EXAMPLE FOR COMPARISON

As specimen A for comparison, an aluminum/silicon mixed film containing silicon by 15 atomic % relative to the total quantity of aluminum and silicon was formed to a length of about 200 nm on a glass substrate by sputtering. A target formed by placing two 15 mm-squre silicon chips 13 on a 4-inch aluminum target was used. The sputtering operation was conducted by using an RF power source under the condition of an Ar flow rate: 50 sccm, a discharge pressure: 0.7 Pa and a making power: 1 kW. The substrate was held to room temperature.

Thereafter, the specimen A was observed through an FE-SEM. When the surface was viewed from right above the substrate, it was found that the aluminum nano-structure parts were not circular but appeared like ropes. In other words, a nano-structure in which cylinder-shaped aluminum structure parts were uniformly dispersed in a silicon region was not obtained. The size of the cylinder-shaped aluminum structure parts by far exceeded 10 nm. When a cross section of the specimen was observed through an FE-SEM, it was found that the aluminum nano-structure parts had a width exceeding 15 nm. The obtained aluminum/silicon mixed film was analyzed for the partial quantity (atomic %) of silicon relative to the total quantity of aluminum and silicon by means of ICP. As a result, the partial quantity of silicon relative to the total quantity of aluminum and silicon was found to be about 15 atomic %.

Additionally, as specimen B for comparison, an aluminum/silicon mixed film containing silicon by 75 atomic % relative to the total quantity of aluminum and silicon was formed to a thickness of about 200 nm on a glass substrate by sputtering. A target formed by placing fourteen 15 mm-squre silicon chips 13 on a 4-inch aluminum target was used. The sputtering operation was conducted by using an RF power source under the condition of an Ar flow rate: 50 sccm, a discharge pressure: 0.7 Pa and a making power: 1 kW. The substrate was held to room temperature.

Thereafter, the specimen B was observed through an FE-SEM. When the surface was viewed from right above the substrate, no aluminum parts were found. When a cross section of the specimen was viewed through an FE-SEM, no aluminum parts were clearly observed. The obtained aluminum/silicon mixed film was analyzed for the partial quantity (atomic %) of silicon relative to the total quantity of aluminum and silicon by means of ICP. As a result, the partial quantity of silicon relative to the total quantity of aluminum and silicon was found to be about 75 atomic %.

Aluminum/silicon mixed film specimens containing silicon respectively by 20 atomic %, 35 atomic %, 50 atomic %, 60 atomic % and 70 atomic % relative to the total quantity of aluminum and silicon were formed under the condition same as that of specimen A for comparison except that different number of silicon chips were used. In the table below, specimens in which cylinder-shaped aluminum structure parts were uniformly dispersed in a silicon region are marked by o, whereas those in which cylinder-shaped aluminum structure parts were not uniformly dispersed are marked by $^x$.

TABLE 1

| silicon ratio (atomic %) | nano-structure |
| --- | --- |
| 15 (specimen A for comparison) | x |
| 20 | o |
| 25 | o |
| 35 | o |
| 50 | o |
| 55 | o |
| 60 | o |
| 65 | o |
| 70 | o |
| 75 (specimen B for comparison) | x |

Thus, the diameter of the produced aluminum nano-structure parts can be controlled by regulating the partial quantity of silicon relative to the total quantity of aluminum and silicon so as to be not smaller than 20 atomic % and not greater than 70 atomic %. With this arrangement, it is possible to produce highly linear aluminum wires. A TEM (transmission electron microscope) may be used to confirm the structure of the produced nano-structure in place of an SEM. The above statement about the silicon content also applies when silicon is replaced by germanium or a mixture of silicon and germanium is used.

Still additionally, as specimen C for comparison, an aluminum/silicon mixed film containing silicon by 55 atomic % relative to the total quantity of aluminum and silicon was formed to a thickness of about 200 nm on a glass substrate by sputtering. A target formed by placing eight 15 mm-squre silicon chips 13 on a 4-inch aluminum target was used. The sputtering operation was conducted by using an RF power source under the condition of an Ar flow rate: 50 sccm, a discharge pressure: 0.7 Pa and a making power: 1 kW. The substrate was held to 250° C.

Thereafter, the specimen C was observed through an FE-SEM. When the surface was viewed from right above the substrate, no clear boundaries of aluminum and silicon were found. In other words, no aluminum nano-structure parts were found. It may be safe to assume that, when the substrate temperature is too high, the deposited film is moved into a more stable state to prevent growth of a film adapted to form aluminum nano-structure parts.

Preferably, the composition of the target may be selected to show a ratio of Al:Si=55:45 for the purpose of producing a structure including dispersed cylinder-shaped members.

EXAMPLE 2

In this example, a fluid control device was prepared by following the steps illustrated in FIGS. 4A through 4D, using an anodization apparatus as shown in FIG. 6.

Step a) Preparation of Multilayer Film (see FIG. 4A)

Firstly, AlSi mixed films 41 were formed on a sufficiently flat aluminum foil 42 to a thickness of 300 nm. A total of eight different films were formed by changing the value of x by 0.1 each time between x=0.1 and 0.8 in the composition $Al_{1-x}Si_x$ of AlSi mixed film 41.

Step b) Formation of Fine Pores in AlSi Layer (see FIG. 4B)

An anodization process was conducted by using an anodization apparatus as shown in FIG. 6.

In this step, a 3 mol/l aqueous solution of sulfuric acid was used as electrolytic solution and held to 20° C. in a thermostatic water tank. The anodization voltage was DC 2V and the electrode was arranged at the side of the aluminum foil to make the anodization process proceed uniformly. During the anodization step, the anodization current was monitored in order to detect the electric current that indicated that anodization proceeded from the surface of the AlSi mixed film 41 and reached the aluminum layer.

After the anodization process, the specimens were washed with pure water.

Step c) Formation of Fine Pores in Aluminum Foil (see FIG. 4C)

An anodization process was conducted by using an anodization apparatus as shown in FIG. 6 as in Step b).

In this step, a 0.3 mol/l aqueous solution of oxalic acid was used as electrolytic solution and held to 17° C. in a thermostatic water tank. The anodization voltage was DC 40V and the electrode was arranged at the side of the aluminum 42 to make the anodization process proceed uniformly. During the anodization step, the anodization current was gauged in order to detect the extent to which anodization proceeded from the surface of the aluminum foil and the integrated quantity of anodization current was monitored. The anodization process was terminated when almost all the aluminum 42 had been anodized.

Figure 4D:
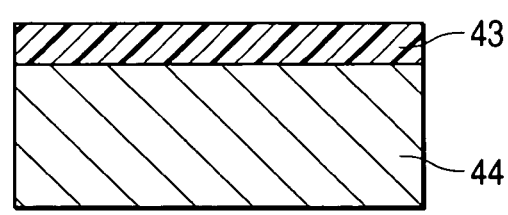

Step d) Etching Process (see FIG. 4D)

After the anodization process, the obtained specimens were dipped into phosphoric acid to increase the diameter of the fine pores of the anodized alumina and remove the remaining aluminum.

(Test Results)

The prepared specimens were observed through an FE-SEM for the surface and a cross section. As a result, it was found that the AlSi mixed film 41 had been oxidized and turned into a silicon based micro-porous film 43 having very fine pores with diameter between 2 and 8 nm in each of the specimens of x=0.2 through 0.7 in the composition $Al_{1-x}.Si_x$, whereas very fine pores had not been formed to a satisfactory level in the specimen of x=0.8 and the diameter of the very fine pores was too large and inappropriate in the specimen of x=0.1. It was also found that the anodized alumina film 44 had been turned into a porous film in which pores had a diameter of about 70 nm and the gap separating adjacent pores was about 100 nm. In each of the silicon based micro-porous film 43 and the anodized alumina film 44, pores were running in a direction perpendicular to the film surfaces.

Figure 7:
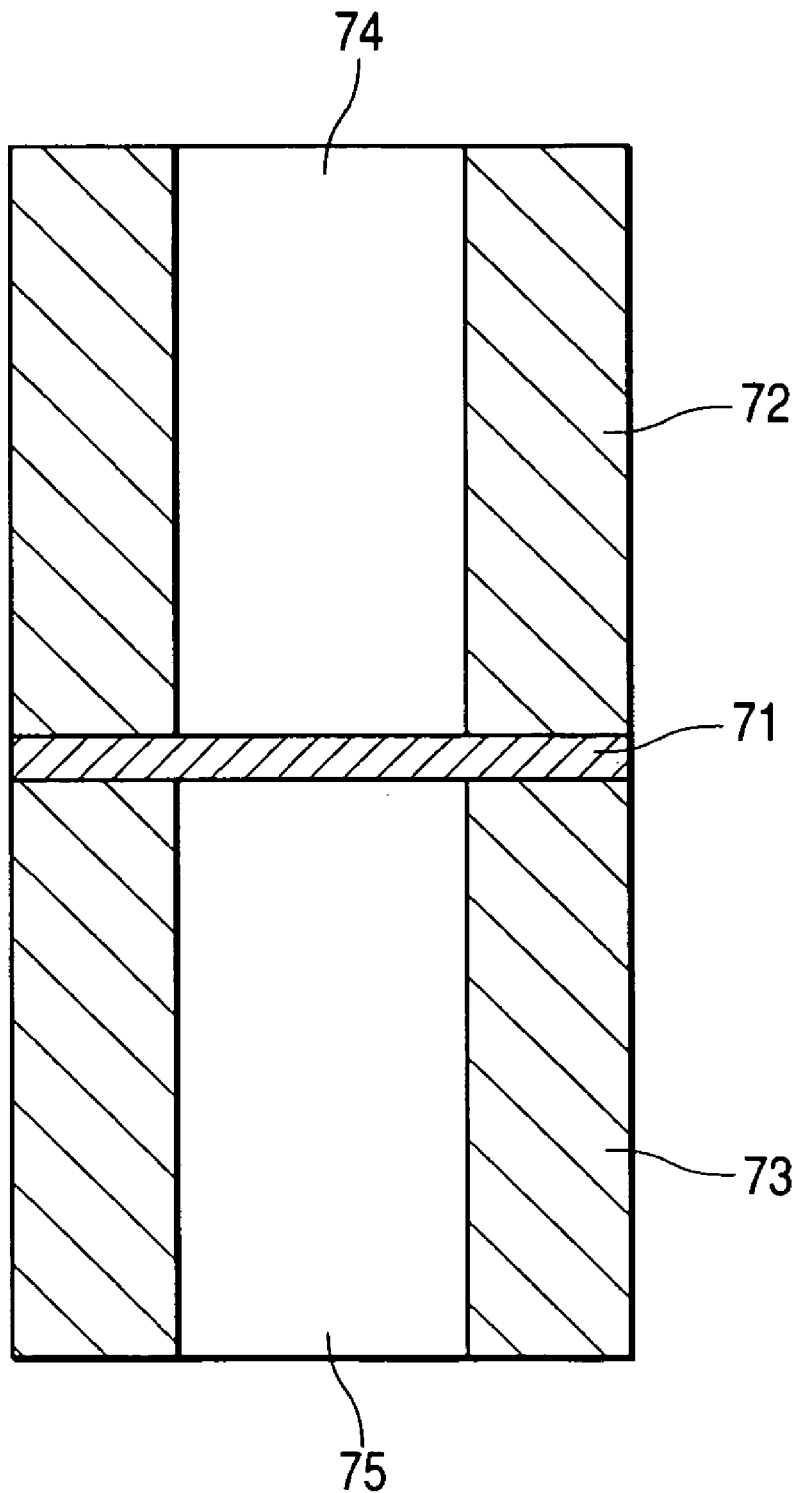
FIG. 7 schematically illustrates a fluid control device used as filter in an example.

Each of the peeled specimens of multilayer film was put in an apparatus as shown in FIG. 7 to see if they operate properly as fluid control device, or filter. In FIG. 7, reference symbol 71 denotes the prepared fluid control device. In FIG. 7, there are also shown an upstream side flow path 72, a downstream side flow path 73, a flow-in hole 74 and a flow-out hole 75.

In the apparatus of FIG. 7, an aqueous solution in which fine particles of a size of about 10 nm were dispersed was poured into the upstream side flow path 72 from the flow-in hole 74 and the solution coming out from the flow-out hole 75 through the fluid control device 71, or filter, and the downstream side flow path 73 was examined to find that the fine particles had been removed.

As a result, it was proved that the specimens of fluid control device of this example operated as filters. The specimens of fluid control device formed by using AlSi mixed films with x=0.3 through 0.5 were found to have operated particularly excellently as filter from the viewpoint of separation characteristic and flux characteristic.

EXAMPLE 3

A multilayer film was prepared in this example as in Example 2, although x=0.4 was selected for the composition $Al_{1-x}.Si_x$ of the AlSi layer whose film thickness was made to be equal to 100 nm.

While anodization was used in the step of forming fine pores in the AlSi layer in Example 2 (FIG. 4B), a step of immersing the AlSi layer in an aqueous solution of phosphoric acid was used in this example. As a result of immersing the AlSi layer into a 5 mass % aqueous solution of phosphoric acid for 2 hours, the Al cylinders of the AlSi layer were dissolved so that the AlSi layer was turned into a porous film of amorphous silicon having very fine pores. Thereafter, an aluminum foil was anodized as in Example 2 to prepare a fluid control device.

The prepared fluid control device was tested for its function as in Example 2 and results similar to those of Example 2 were obtained.

Thus, as a result of this example, it was found that either silicon oxide or amorphous silicon may be used for the silicon based micro-porous film of a fluid control device according to the invention to make the device operate satisfactorily.

EXAMPLE 4

In this example, specimens of fluid control device were prepared by following the steps shown in FIGS. 5A through 5D.

Figure 5A:
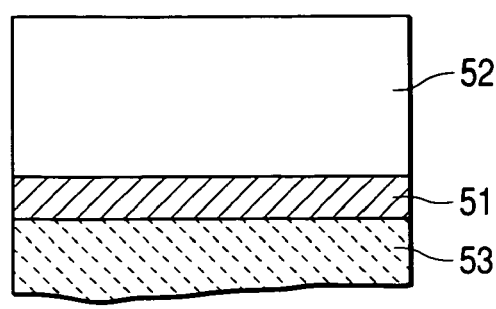
FIGS. 5A, 5B, 5C and 5D schematically illustrate the steps of another embodiment of method of manufacturing a fluid control device according to the invention.

Step a) Formation of Multilayer Film (see FIG. 5A)

For each specimen, an AlSi mixed film 51 was formed on an Si substrate with x=0.4 for the composition $Al_{1-x}.Si_x$. An aluminum film 52 was laid thereon by 10 μm for one of the specimen, whereas a Ti film was formed to a thickness of 2 nm thereon and subsequently an aluminum film 52 was laid thereon by 10 μm for the other specimen.

Figure 5B:
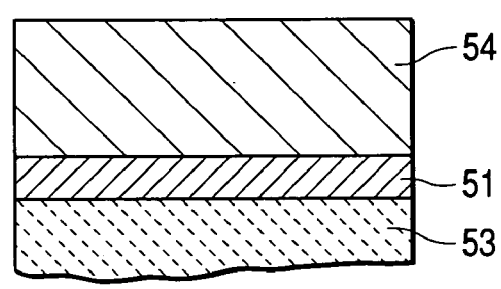

Step b) Formation of Fine Pores in Aluminum Film (see FIG. 5B)

An anodization process was conducted as in Example 2 by means of an anodization apparatus as shown in FIG. 6.

In this step, a 0.3 mol/l aqueous solution of oxalic acid was used as electrolytic solution and held to 17° C. in a thermostatic water tank. The anodization voltage was DC 40V. During the anodization step, the anodization current was gauged in order to detect the extent to which anodization proceeded from the surface of the aluminum film 52 and the integrated quantity of anodization current was monitored. When it was detected that the aluminum film 52 had been anodized by 90%, the anodization bath was switched to a 0.3 mol/l aqueous solution of sulfuric acid and the voltage was reduced to 20V to anodize the remaining aluminum film 52.

Figure 5C:
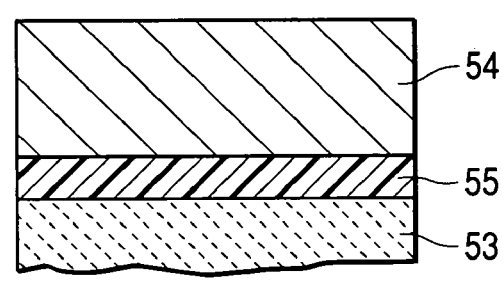

Step c) Formation of Fine Pores in AlSi Mixed Layer (see FIG. 5C)

Subsequently, a 3 mol/l aqueous solution of sulfuric acid was used as electrolytic solution and the AlSi mixed film 51 was anodized with an anodization voltage of DC 2V. During the anodization step, the anodization current was monitored in order to detect the electric current that indicated that anodization reached the Si substrate. The anodization process was terminated when the electric current was sufficiently reduced.

After the anodization process, the specimens were washed with pure water.

Figure 5D:
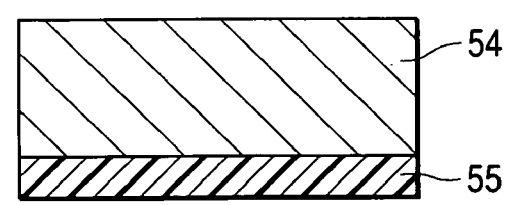

Step d) Etching Process (see FIG. 5D)

After the anodization process, the obtained specimens were dipped into phosphoric acid to increase the diameter of the fine pores of the anodized alumina and peel off the silicon based micro-porous film from the Si substrate.

(Test Results)

The prepared specimens were observed through an FE-SEM for the surface and a cross section. As a result, it was found that the AlSi mixed film 51 had been oxidized and turned into a silicon based micro-porous film 55 having very fine pores with diameter between 2 and 8 nm and the anodized alumina film 54 had been turned into a porous film of which about the upper 90% had fine pores with a diameter of about 70 nm and a gap separating adjacent pores by 100 nm while the remaining part that was close to the junction with the silicon based micro-porous film 55 had fine pores with a diameter of about 20 nm and a gap separating adjacent pores by 50 nm. In each of the silicon based micro-porous film 55 and the anodized alumina film 54, pores were running in a direction perpendicular to the film surfaces.

Each of the peeled specimens of multilayer film was put in an apparatus as shown in FIG. 7 to see if they operate properly as fluid control device, or filter.

As a result, it was proved that the specimens of fluid control device of this example operated as filters, as in Example 2. It was also found that the specimen, in which Ti was inserted between the AlSi mixed film and the aluminum film, was more advantageous in terms of mechanical characteristics than the one without Ti.

As described above in detail, the present invention provides a fluid control device that has very fine pores (with an average diameter of not greater than 10 nm) and allows a high flux. According to the invention, 1) a fluid control device showing an excellent supporting ability is provided when it is provided with a film having fine pores formed by anodizing a material containing aluminum as principal ingredient (anodized alumina film) and 2) a fluid control device having very fine pores that have a diameter of several nanometers and vertically running through the device is provided when it is provided with a film containing silicon as principal ingredient and having very fine pores (silicon based micro-porous film). A fluid control device according to the invention can be used as a filter or an ultrafilter device. In other words, the present invention provides a fluid control device having a remarkably broad scope of application.

What is claimed is:

1. A method of manufacturing a fluid control device comprising:
   a step of forming a layer containing aluminum as principal ingredient;
   a step of forming a mixed film of $Al_{1-x} \cdot Si_x$ ($0.2 \leq x \leq 0.7$) including cylinders having an average diameter not greater than 10 nm and containing aluminum as principal ingredient;
   a step of forming fine pores in said layer containing aluminum as principal ingredient by anodization; and
   a step of removing the cylinders containing aluminum as principal ingredient from said mixed film of $Al_{1-x} \cdot Si_x$.

2. A method according to claim 1, wherein said mixed film of $Al_{1-x}Si_x$ ($0.2 \leq x \leq 0.7$) is formed by sputtering.

3. A method according to claim 2, wherein said step of removing the cylinder containing aluminum as principal ingredient is a step using chemical etching.

4. A method according to claim 1, further comprising.
   a step of oxidizing the film obtained by removing said cylinders containing aluminum as principal ingredient and transforming it into a silicon oxide film having very fine pores after said step of removing cylinders containing aluminum as principal ingredient.

5. A method according to claim 1, wherein said step of removing cylinders containing aluminum as principal ingredient is a step of anodizing said mixed film of $Al_{1-x}Si_x$.

6. A method according to claim 5, wherein said step of anodizing said mixed film of $Al_{1-x}Si_x$ is a step conducted in an sulfuric acid solution and also a step of anodizing said layer containing aluminum as principal ingredient in an sulfuric, oxalic or phosphoric acid.

7. A method according to claim 1, further comprising a step of annealing at temperature not lower than 100° C. after the completion of all of said steps.

* * * * *